United States Patent
Spink et al.

(10) Patent No.: US 6,579,506 B2
(45) Date of Patent: Jun. 17, 2003

(54) TREATMENT OF GAS STREAMS CONTAINING REDUCED SULFUR COMPOUNDS

(75) Inventors: Edward F. Spink, Waterloo (CA); Egbert Q. Van Everdingen, Kitchener (CA); Christopher R. Mueller, Kitchener (CA)

(73) Assignee: Turbotak Technologies Inc., Waterloo (CA)

(*) Notice: Subject to any disclaimer, the term of this patent is extended or adjusted under 35 U.S.C. 154(b) by 78 days.

(21) Appl. No.: 09/816,392

(22) Filed: Mar. 26, 2001

(65) Prior Publication Data

US 2002/0034468 A1 Mar. 21, 2002

Related U.S. Application Data

(63) Continuation-in-part of application No. 08/710,477, filed on Sep. 18, 1996, now abandoned.
(60) Provisional application No. 60/003,886, filed on Sep. 18, 1995.

(51) Int. Cl.$^7$ ................................................ P01D 53/48
(52) U.S. Cl. ................ 423/210; 423/215.5; 423/220; 423/224; 423/242.1; 423/243.01; 423/DIG. 5
(58) Field of Search ................... 162/51; 423/210, 423/224, 242.1, 243.01, 243.08, 243.09, 242.2, DIG. 5, 220, 215.5

(56) References Cited

U.S. PATENT DOCUMENTS

| | | | |
|---|---|---|---|
| 2,830,869 A | 4/1958 | Limerick | 162/51 |
| 4,431,617 A | 2/1984 | Farin | 423/232 |
| 4,505,776 A | 3/1985 | Murray | 162/51 |
| 5,192,517 A | 3/1993 | Spink | |

FOREIGN PATENT DOCUMENTS

| | | |
|---|---|---|
| CA | 643389 | 6/1962 |
| JP | 53-35674 | 4/1978 |

OTHER PUBLICATIONS

Perry et al. *Chemical Engineers' Handbook* (5th Ed.) McGraw–Hill Book Co. USA;15BN 0–67–049478–9; p. 22–4, 1973.*

Rushton J.D., Sirrine J.E., Collection and Treatment of Odorous Kraft Mill Gases. Paper Trade Journal/ 1972, pp. 36–37. (Dec. 18, 1972).

* cited by examiner

Primary Examiner—Stanley S. Silverman
Assistant Examiner—Timothy C. Vanoy
(74) Attorney, Agent, or Firm—Sim & McBurney

(57) ABSTRACT

Gas streams containing non-condensible gases (NCG's) including reduced sulfur compounds, such as hydrogen sulfide, dimethyl sulfide, dimethyl disulfide and mercaptans, are treated to remove the NCG's from the gas stream. Following an optional initial gas-liquid contact to cool the gas stream to its adiabatic dewpoint and to remove particulates, the gas stream is subjected to an intimate gas-liquid contact with aqueous chlorine dioxide, in one or more contact stages, to oxidize the reduced sulfur compounds and other oxidizable compounds present in the gas stream, and then the gas stream is passed through an entrainment separator to remove entrained liquid droplets. Acidic gases produced in the oxidization stage and residual chlorine dioxide generally are removed from the gas steam by intimate gas-liquid contact of the gas stream with an aqueous neutralizing and reducing solution, in one or more contact stages, and ten the gas stream is passed through an entrainment separator to remove entrained liquid droplets.

17 Claims, 2 Drawing Sheets

TREATMENT OF GAS STREAMS CONTAINING REDUCED SULFUR COMPOUNDS

REFERENCE TO RELATED APPLICATION

Figure 1:
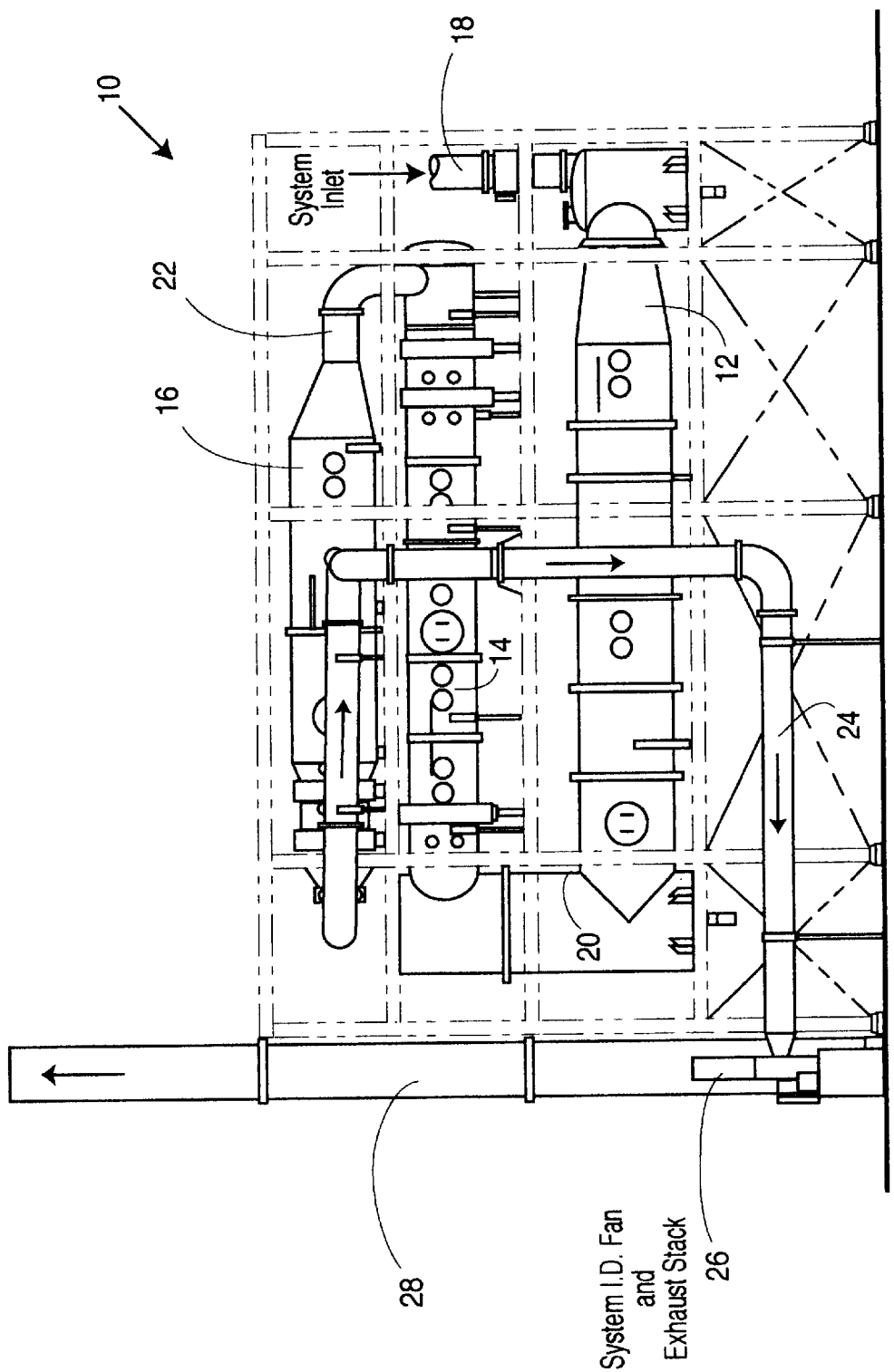

This application is a continuation-in-part of copending U.S. patent application Ser. No. 08/710,477 filed Sep. 18, 1996, now abandoned, which claims benefit of U.S. Provisional Application No. 60/003,886, filed on Sep. 18, 1995.

FIELD OF INVENTION

The present invention relates to the treatment of gas streams, particularly gas streams containing non-condensible gases (NCG's) including total reduced sulfur (TRs) gases.

BACKGROUND TO THE INVENTION

Non-condensible gases (NCG), which include reduced sulfur compounds, are various gaseous components in tail gas streams arising from various industrial sources. In many industries, including the chemical and pulp and paper industries, the emission of these gas streams containing reduced sulfur compounds presents a major challenge related to the elimination of the odor associated with the compounds. The odors are foul and people can smell their presence at parts per billion levels. Typical reduced sulfur compounds are hydrogen sulfide ($H_2S$), dimethyl sulfide (DMS) and any of its homologs, dimethyl disulfide (DMDS) and any of its homologs, mercaptans including methyl mercaptans and its homologues, and various other sulfur-containing compounds. The homologs of methyl mercaptan, DMS and DDMS include the corresponding ethyl-, propyl- or butyl-organic sulfur compounds.

While there are a number of methods available to remove $H_2S$ from gas streams, certain mercaptans and the methyl sulfides are fairly stable and exhibit low solubility in aqueous solutions, especially DMDS, and resist removal by conventional $H_2S$-removal processes.

Canadian Patent No. 643,349 describes the removal of sulfur compounds in a pulp mill environment using spent chlorination effluent from a bleach plant in a pulp mill followed by contact of the heated gas stream with alkali. The spent chlorination effluent contains hypochlorite for the purpose of oxidation of sulfur compounds.

U.S. Pat. No. 4,505,776 describes a procedure in which hydrogen sulfide first is absorbed from flue gas in pulp mill black liquor (spent pulping liquor) and the resulting solution then is oxidized. The contaminated flue gas is initially cooled to near its dew point and scrubbed with water to remove particulates.

For years, non-condensible gases (NCG) in Kraft mills which contain such reduced sulfur compounds, were typically routed to the boilers and lime kilns for treatment. On incineration, the sulfur content of the NCG is convened to $SO_2$, which must then be removed by scrubbing. Lime kilns are not always in operation; in this case the gases would be vented to a stack or routed to a power boiler for treatment, again producing $SO_2$ which must itself be treated.

Since mid-1997 in the U.S., all NCG-containing gases must be treated by a fully committed process to below about 5 ppm before release. Kraft mills have many sources of such gases, including emissions from chemical recovery boilers, digesters, brown stock washers, effluent treatment systems, etc.

Incineration of NCG's is expensive in that it requires an incinerator (an expensive energy intensive approach) and an $SO_2$ scrubber.

We have conducted pilot studies at a number of Kraft mills over the past twenty years. Such tests were conducted on recovery boiler emissions at four different mills. In early tests (1975) conducted at a MacMillan Bloedel mill at Portage-du-Fort, Quebec, the task was to recover the salt cake not captured by The electrostatic precipitator. Excellent results were obtained. However, it was noted that the TRS had been significantly removed in the scrubber. The second such test (1987) was conducted at a Boise Cascade mill located in Fort Francis, Ontario with similar results. The next thee tests were conducted at a MacMillan Bloedel mill located at Powell River, B.C., the first to demonstrate salt cake removal and the next two to demonstrate removal of TRS compounds. A subsequent test was performed at a Cascades mill in East Angus, Quebec.

Using various chemicals in the scrubbing liquors, it was found that high salt cake recovery could be coupled with removal of TRS primarily $H_2S$ to undetectable levels. It was subsequently found that the chemistry used at the Powell River and East Angus mills could not adequately destroy DMDS.

In U.S. Pat. No. 5,192,517. assigned to the assignee hereof and the disclosure of which is incorporated herein by reference, there are described gas/liquid contact systems for the removal of solute gases containing sulfur dioxide by contact of the gas stream in a conduit with atomized sprays of aqueous alkaline medium delivered by non-plugging dual-fluid nozzles which form droplets sized about 5 to about 100 microns.

Utilization of various specific chemistries and pHs coupled with variables inherent to the scrubbers described in U.S. Pat. No. 5,192,517, however, has led to the development of a complete solution to the problem, as provided herein. During the tests at a James River Corporation mill in Alabama, the mill used gas chromatography on inlet and outlet samples to and from the scrubber. It was firmly established during these tests that all reduced sulfur compounds were reduced to below detection limits.

SUMMARY OF INVENTION

In accordance with the present invention, there is provided a novel procedure for the elimination of NCG-containing gases and odours associated with them. Such procedure involves, optionally, prescrubbing the odorous gas stream by intimate gas-liquid contact to cool the gas to its adiabatic dewpoint, if necessary, while simultaneously removing particulate matter present in the gas steam, scrubbing the prescrubbed gas with an oxidizing liquid which is an aqueous solution of chlorine dioxide by intimate gas/liquid and gas/gas contact in one or more contact stages to oxidize reduced sulfur compounds and any other oxidizable compounds present in the prescrubbed gas stream, such contacting being erected by finely atomizing the aqueous solution of chlorine dioxide into the gas stream in each of the contact stages to form a spray of droplet size distribution of about 5 to about 250 microns Sauter Mean Diameter (SMD), and then passing the treated gases through an entrainment separator, for example, a mist eliminator, to remove entrained liquid droplets from the gas stream prior to discharge to a stack. The other oxidizable compounds which may be present in the treated gas stream include methanol or other alcohol, such as ethanol, propanol or butanol. The latter materials also may be separated in an additional operation.

The use of an aqueous solution of chlorine dioxide as the oxidizing liquid results in a more efficient removal of the sulk gases, particularly dimethyl sulfide and dimethyl disulfide, which are of limited solubility in aqueous media, than other oxidizing material, such as the sodium hypochlorite described in the prior an referred to above.

An aqueous solution of chlorine dioxide can be atomized utilizing very low energy levels and provides both oxidation in solution in the liquid droplets for gases absorbed therein and gaseous phase oxidation, resulting from partial gassing off of chlorine dioxide as the atomized solution contacts the containment-laden, high temperature gas stream, for gases remaining in the gaseous phase. This combined oxidation results in effective high efficiency scrubbing of reduced sulfa gases, easily achieving a regulatory requirement of residual values of reduced sulfur compounds below 5 ppm.

If necessary, the gases leaving a first oxidation stage entrainment separator may be contacted with a neutralizing and reducing solution by intimate gas-liquid contact in one or more contact stages to remove acidic compounds, such as $H_2SO_4$ and/or HCl, formed in the oxidizing stage reaction while reducing any residual chlorine dioxide remaining from the first oxidation stage present in the gas stream. The neutralizing and reducing solution may include an aqueous caustic solution alone or in combination with one or more reducing agents. Such intimate gas-liquid contact may be effected by finely atomizing the aqueous neutralizing and reducing solution into the gas stream in each of the contact stages to form a spray of droplet size distribution of about 5 to about 100 SMD.

White liquor (Kraft mill pulping liquor), which may be considered to be a very basic solution of sodium hydroxide and sodium sulfide, is a particularly useful material for this purpose, since the high pH component effectively neutralizes acidic gases in the gas stream while the sulfide portion effectively reduces any chlorine dioxide oxidant remaining in the gas stream as it is oxidized to sulfate. White liquor usually is used in a Kraft pulp mill for pulping wood chips to release the cellulose fibers from the wood chips and, when the process is applied to NCGs in a Kraft pulp mill, is a readily-available material.

Such treated gases then may pass through a second entrainment separator stage using an appropriate entrainment separator prior to discharge from the system through an exhaust stack.

BRIEF DESCRIPTION OF DRAWINGS

FIG. 1 is a schematic representation of an apparatus for effecting the removal of reduced sulfur gases from a gas stream according to one embodiment of the invention; and FIG. 2 is a schematic representation of an apparatus for effecting the removal of reduced sulfur gases from a gas stream according to a second embodiment of the invention.

GENERAL DESCRIPTION OF INVENTION

In the present invention, a gas stream containing NCG's and optionally particulates is processed to very low residual level of reduced sulk compounds. This procedure involves an adaptation of the intimate gas/liquid contact procedures described in the aforementioned U.S. Pat. No. 5,192,517 for sulfur dioxide removal to the removal of reduced sulfur compounds. In general, the equipment described in tat patent is employed in the present invention Usually, there is an initial prescrubbing of the gas stream by intimate gas-liquid contact to cool the gas stream to its adiabatic dewpoint and to remove particulate matter present in the gas stream. Such inmate gas-liquid contact is effected by an aqueous contact medium, such as water, which is injected into the gas stream flowing through a contact chamber under an atoning pressure of about 5 to about 100 psig, preferably about 20 to about 55 psig, generally using air as the atomizing gas, from a dual-fluid spray nozzle located so as to form a spray pattern of fine liquid droplets varying in size distribution from about 5 to about 250 microns Sauter Mean Diameter (SMD), preferably about 10 to about 100 microns SMD. A contact spray zone for the gas stream hereby is provided.

In place of water as to the scrubbing liquid in the prescrubbing operation, there may be used an aqueous alkaline solution, generally an aqueous solution of sodium hydroxide, which has the effect of absorbing some of the more acidic gases, mainly hydrogen sulfide and methyl mercaptans, which are present in the gas stream, which then decreases the requirement for chlorine dioxide in the subsequent oxidation stage.

The initial prescrubbing may be effected in any convenient manner. In one embodiment, the gas stream passes from an inlet in au upper portion of the contact chamber first in a vertically-downward flow path in the contact chamber and then in a vertically-upward flow path in the contact chamber to an outlet in the upper portion of the contact chamber. The gas stream may be contacted by the aqueous scrubbing medium in the form of a spray pattern in both the vertically-downward flow path and in the vertically-upward flow path. The gas stream may be contacted cocurrently or countercurrently with the spray pattern(s) from the spray nozzle(s).

The NCG-containing gas stream, which may be prescrubbed to remove particulates, cooled and/or some acid gases removed as described above, then is passed trough an elongate conduit from an inlet thereto to an outlet therefrom. In the conduit, an aqueous solution of chlorine dioxide is injected directly into the gas stream under an atomizing pressure of about 15 to about 100 psig preferably about 20 to about 55 psig, generally using air as the atomizing gas, from at least one, usually a plurality of, dual-fluid spray nozzles coaxially disposed in the conduit so as to form a spray pattern from the nozzle filling homogeneously the cross-section of the conduit and containing liquid droplets ranging in size distribution from about 5 to about 250 microns SMD, preferably about 10 to about 100 microns SMD, thereby to form, from each such nozzle, a contact spray zone for the gas stream passing through the conduit.

The aqueous chlorine dioxide solution which is utilized may have a concentration of about 1 to 10 g/L preferably about 2 to about 5 g/L. The overall quantity of aqueous chlorine dioxide solution which is employed depends on the overall quantity of reduced sulfur compounds in the gas stream to be reduced by the aqueous chlorine dioxide solution. The overall quantity of chlorine dioxide used should be at least sufficient to oxidize all the chemical oxygen demand of the incoming gas stream to the conduit, mainly. The reduced sulfur compounds, generally in a molar ratio of about 1:1 to about 3:1. In general, the chlorine dioxide solution may be used in an amount of about 0.1 to about 10 gallon/1000 cfm of gas stream, depending on the concentration of chlorine dioxide solution employed and the concentration of reduced sulfur compounds in the gas stream.

Downstream detection devices may be provided associated with the exhaust from the process to detect residual reduced sulfur compounds levels in the exhaust gas stream in excess of a permitted maximum value, generally about 5 ppm, with feedback to increase the rate of feed of the aqueous chlorine dioxide solution to the elongate conduit to remove such excess reduced sulfur compounds to return the concentration in the exhaust gas stream to below the permitted maximum value.

The oxidation stage generally is carried out at the ambient temperature of the gas stream entering the conduit, generally about 35° C. to about 85° C., preferably about 60° to about 85° C. Hotter temperatures tend to increase the rate of flashing off of the chlorine dioxide from the spray pattern(s) in the conduit into the gaseous phase and hence the rate of reaction.

In each contact spray zone, more readily soluble reduced sulfur gases, such as hydrogen sulfide and methyl mercaptans, are absorbed by the droplets of aqueous chlorine dioxide solution and oxidized by the chlorine dioxide therein while less readily soluble sulfur gases, such as dimethyl sulfide and dimethyl disulfide, are contacted with gaseous chlorine dioxide gassed off from the liquid droplets and are oxidized in the gaseous phase. It is the ability to oxidize the reduced sulfur gases in both The liquid and gaseous phases which leads to the improved removal efficiencies of the invention. The gas stream may be contacted countercurrently or cocurrently with the spray pattern(s) from the spray nozzle(s).

The treated gas stream, containing gaseous phase acidic compounds formed by oxidation of the reduced sulfur compounds, such acidic compounds generally being $H_2SO_4$ and/or HCl, and residual gaseous unreacted chlorine dioxide, along with entrained liquid droplets, is next passed through an entrainment separator or demister at the outlet end of the conduit, to agglomerate and remove entrained liquid droplets from the gas stream before the treated gas stream passes through the outlet from the conduit.

The combined liquid phase and gaseous phase oxidations of the reduced sulfur compounds by chlorine dioxide by utilizing one or more spray patterns efficiently and rapidly removes fix reduced sulfur compound from the gas stream, providing residual reduced sulfur compound concentrations in the gas stream exiting the conduit of less than 5 ppm.

The treated gas stream exiting the outlet from the elongate conduit generally is further processed to remove the residual contaminants, mainly in the form of acid gases and unreacted chlorine dioxide, therefrom. For this purpose, the treated gas stream is passed through a further elongate conduit from an inlet hereto to an outlet therefrom. In the conduit, an aqueous neutralizing and reducing solution is injected directly into the gas stream under an atomizing pressure of about 15 to about 100 psig, preferably about 20 to about 55 psig, generally using air as the along gas, from at least one, generally a plurality of, dual-fluid spray nozzles coaxially disposed in the conduit so as to form a spray pattern from the nozzle filling homogeneously the cross-section of the conduit and containing liquid droplets ranging in size distribution from about 5 to about 100 microns SMD, preferably about 20 to about 60 microns SMD, thereby to form, from each such nozzle, a contact spray zone in the further conduit.

In each contact spray zone, the acidic compounds and gaseous chlorine dioxide are absorbed by the liquid droplets, with the neutralizing component in the solution neutralizing the acid gases and the reducing component of the solution reducing the chlorine dioxide. One suitable material which can be employed for his purpose and which is readily available in a pulp mill environment is white liquor (Kraft pulping liquor), which is an aqueous solution of sodium hydroxide, to neutralize the acid gases, and sodium sulfide, to reduce chlorine dioxide to less chemicals. Alternatively, the neutralizing and reducing solution may be an aqueous solution of sodium sulfite or alkaline hydrogen peroxide.

The quantity of the aqueous neutralizing and reducing solution fed to the further conduit should be at least sufficient to remove the residual contaminants from the gas stream. In general, a molar ratio of aqueous neutralizing and reducing solution to residual contaminants of about 1:1 to about 3:1 may be employed. The gas stream may be contacted cocurrently or countercurrently with the spray pattern(s) from the spray nozzle(s).

Downstream detection devices may be provided associated wit the exhaust from the process to detect residual chlorine dioxide in the exhaust gas stream in excess of a permitted maximum value, with feedback to increase the rate of feed of aqueous neutralizing and reducing solution to the further conduit to ensure removal of the residual chlorine dioxide from the gas stream.

If necessary or desired, multiple oxidation stages may be employed, each followed by a neutralization stage with an alkaline solution, each operating in the manner described above.

The treated gas stream, now substantially free from the original contaminants and containing entrained liquid droplets, is next passed through an entrainment separator or demister at the outlet from the conduit to agglomerate and remove the entrained liquid droplets.

The treated gas stream, if desired, may be passed though to a further elongate conduit from an inlet thereto to an outlet therefrom for removal of methanol vapor or the vapor of other low boiling soluble organic chemical. In the conduit, an aqueous medium, usually water, is injected directly into the gas stream generally using air as the atomizing gas, from at least one, generally a plurality of, dual-fluid spray nozzles coaxially disposed in the conduit so as to form a spray pattern from the nozzle filling homogeneously the cross-section of the conduit, hereby to form, from each such nozzle, a contact spray zone in he further conduit.

In each contact spray zone, the methanol or other low boiling liquid organic compound is absorbed by the liquid droplets. The treated gas stream, now substantially free from methanol vapor, is next passed through an entrainment separator or demister at the outlet from the conduit to agglomerate and remove the entrained liquid droplets.

The purified gas stream then is vented to a stack, after mist elimination using suitable equipment, such as a rotary induction fan, as described in the aforementioned U.S. Pat. No. 5,192,517.

DESCRIPTION OF PREFERRED EMBODIMENT

Referring first to FIG. 1, there is illustrated therein a three-stage apparatus 10 for removing NCG's including reduced sulfur compound from a gas stream according to the procedure described The apparatus 10 includes elongate horizontally-extending conducts 12, 14 and 16 connected in series from an inlet 18 and by conduits 20, 22 and 24 to an induction fan 26 which eliminates mist and exhausts the treated gas stream to the exhaust stack 28.

The conduit 12 acts as the first stage scrubber to saturate the gas stream with moisture and to remove particulates. The conduit 14 acts as the second stage oxidizer to oxidize and remove the chemical oxygen demand, mainly reduced sulfur compounds by gas and liquid phase oxidation with chlorine dioxide. The conduit 16 acts as the third stage neutralizer to neutralize any acid gases resulting from the oxidation and to reduce any residual chlorine dioxide.

While the conduits are shown in a horizontal orientation, a vertical orientation, such as employed in FIG. 2 described below, may be used.

Figure 2:
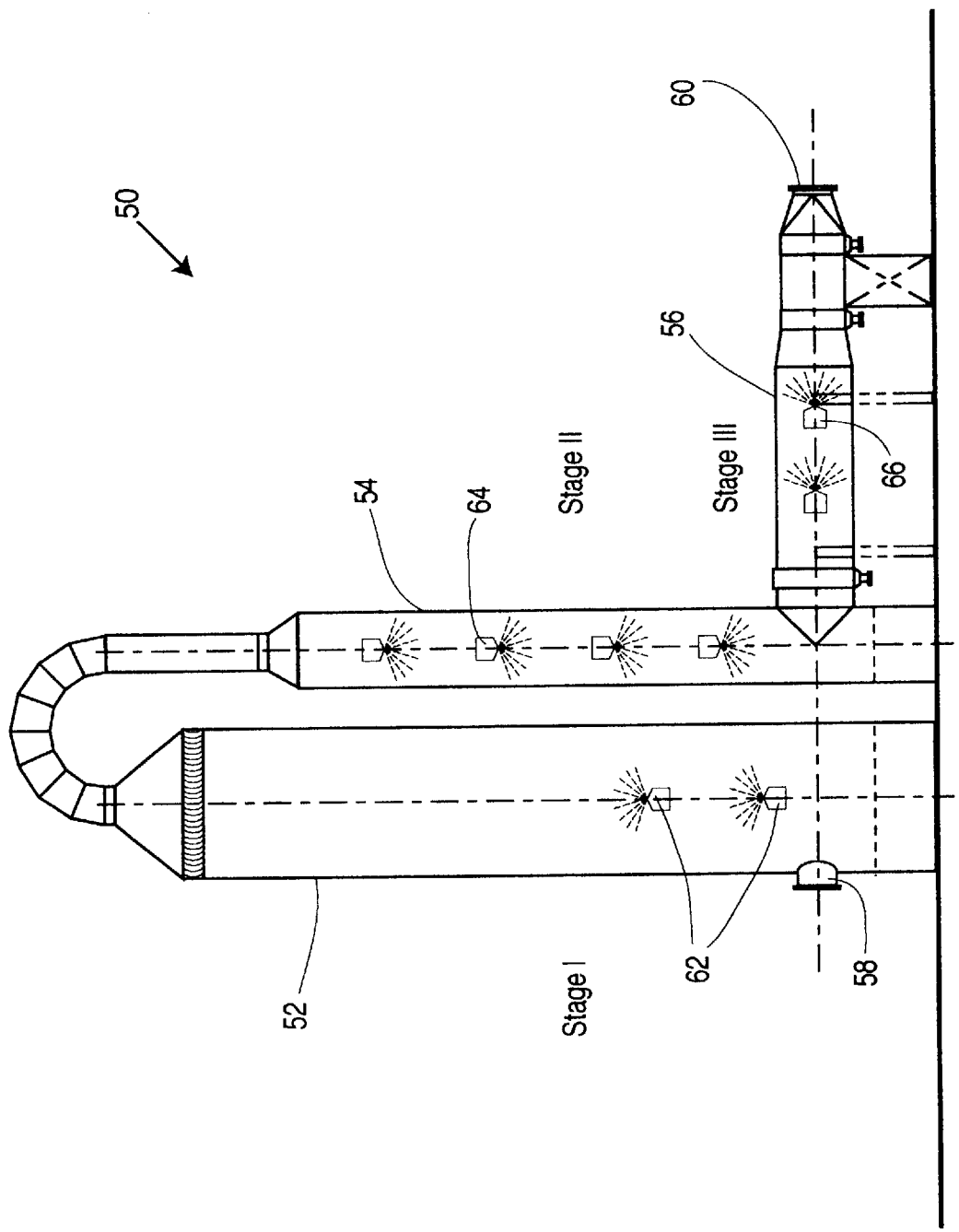

Referring now to FIG. 2, there is illustrated therein a three-stage apparatus 50 for removing NCGs including sulfur compounds from a gas stream, according to procedure described herein. The apparatus 50 comprises elongate vertically extending conduits 52, 54 and an elongate horizontally-extending conduit 56 connected in series from an inlet 58 to an outlet 60. An induction fan may be positioned at the outlet 60 in the same manner as seen in FIG. 1.

The conduit 52 acts as a first stage oxidizer to oxidize and remove the chemical oxygen demand, mainly reduced sulfur compounds, by gas and liquid phase oxidation with chlorine dioxide, sprayed into the gas stream in the form of liquid droplets of an aqueous solution of chlorine dioxide by dual-fluid spray nozzles 62.

The conduit 54 acts as a second stage neutralizer to neutralize any acid gases resulting from the oxidation and to reduce any residual chlorine dioxide, using a neutralization and oxidation medium sprayed into the gas stream in the form of liquid droplets by dual-fluid spray nozzles 64.

The conduit 56 acts as a Gird stage methanol removal to remove from the gas stream methanol vapor or vapor of vapor low boiling organ chemicals using water sprayed into the gas stream in the form of liquid droplets by dual-fluid spray nozzles 66.

EXAMPLES

This invention is illustrated by the following Examples.

which effectively oxidized the reduced sulfur compounds present in the gas stream. The reactions took place in both the liquid and gas phases. The gas steam was then passed through an entrainment separator to remove any $ClO_2$ liquor and scrubbing product before Me gas stream entered he third stage neutralizer scrubber. The third stage comprised a neutralizing stage where white liquor (or other alkaline/reducing agents) was used to neutralize any acidic gas components and reduce any $ClO_2$ remaining in the gas stream prior to release of the gas to a stack, after final mist elimination. This procedure reduced the NCG content of the gas stream to very low levels.

Example 2

This Example illustrates the superiority of chlorine dioxide as an oxidant when compared to aqueous sodium hypochlorite.

A series of experiments were carried out using the equipment illustrated in FIG. 1 on an inlet gas stream containing hydrogen sulfide, methyl mercaptan dimethyl sulfide and dimethyl disulfide, using aqueous sodium hypochlorite ("hypo"), an aqueous solution of sodium hypochlorite and hydrogen peroxide ("hypo/peroxide") and an aqueous solution of chlorine dioxide as the oxidizing medium.

The results obtained for typical runs are shown in the following Table:

| Trial No. | Oxidizer Used | Inlet | | | | Outlet | | | | Efficiency | | | |
|---|---|---|---|---|---|---|---|---|---|---|---|---|---|
| | | H2S | MeSH | DMS | DMDS | H2S | MeSH | DMS | DMDS | H2S | MeSH | DMS | DMDS |
| 1 | hypo | 3.749 | 46.325 | 46.667 | 42.509 | 0.374 | 4.759 | 11.796 | 22.612 | 90.0 | 89.7 | 74.7 | 46.8 |
| 3 | hypo @ increased energy | 3.749 | 46.325 | 46.667 | 42.509 | 0.36 | 0.5 | 0.55 | 1.593 | 90.4 | 98.9 | 98.8 | 96.3 |
| 4 | hypo @ increased energy | 43.155 | 183.96 | 81.27 | 83.475 | 0.45 | 0.6 | 0.77 | 8.89 | 99.0 | 99.7 | 99.1 | 91.7 |
| 5 | hypolperoxide | 30.72 | 141.16 | 70.79 | 89.55 | 0.45 | 0.6 | 0.77 | 8.494 | 98.5 | 99.6 | 98.9 | 90.5 |
| 14 | chlorine dioxide | 18.689 | 149.53 | 174.31 | 151.725 | 0.285 | 0.019 | 1.781 | 1.032 | 98.5 | 100.0 | 99.0 | 99.3 |
| 15 | chlorine dioxide | 18.689 | 149.53 | 174.31 | 151.725 | 0.037 | 0 | 0.636 | 0.451 | 99.8 | 100.0 | 99.6 | 99.7 |

| Trial No. | Oxidizer Used | Nozzel Set Points | | | | | | | | | | White Liquor Tail Scrubbing | | | |
|---|---|---|---|---|---|---|---|---|---|---|---|---|---|---|---|
| | | 1 | | 2 | | 3 | | 4 | | 5 | | 6 | | 7 | |
| | | Usgpm | Psig | Usgpm | Psig | Usgpm | Psig | Usgpm | Psig | Usgpm | Psig | Usgpm | Psig | Usgpm | Psig |
| 1 | hypo | 0.2 | 60 | 0.2 | 60 | 0.2 | 60 | 0.2 | 60 | 0.2 | 60 | | | | |
| 3 | hypo @ increased energy | 0.2 | 60 | 0.2 | 60 | 0.1 | 60 | 0.1 | 60 | 0.1 | 60 | | | | |
| 4 | hypo @ increased energy | 0.2 | 60 | 0.2 | 60 | 0.1 | 60 | 0.1 | 60 | 0.1 | 60 | | | | |
| 5 | hypolperoxide | 0.2 | 60 | 0.2 | 60 | 0.1 | 60 | 0.1 | 60 | 0.1 | 60 | | | | |
| 14 | chlorine dioxide | 0.2 | 40 | 0.7 | 60 | 0.7 | 60 | 0 | 0 | 0.1 | 50 | 0.1–0.55 | 50 | 0.1–0.55 | 50 |
| 15 | chlorine dioxide | 0.2 | 40 | 1.9 | 60 | 1.9 | 60 | 0 | 0 | 0 | 0 | 0.6 | 50 | 0.6 | 50 |

Example 1

A three-stage scrubber was employed in the form shown in FIG. 1. The NCG-containing gases from a pulp mill entering the scrubbing apparatus were first quenched in a pre-scrubber (first stage) to remove any particulates present, to reduce inlet levels of TRS, and to by the gas to its adiabatic dewpoint. The saturated gas stream then was fed into a reaction/scrubbing stage (second stage) where the gas was intimately contacted in the first stage oxidizer scrubber with a solution containing aqueous chlorine dioxide ($ClO_2$), As may be seen, high energy hypochlorite scrubbing had limited effectiveness while low energy chlorate dioxide scrubbing with aqueous and gaseous reaction removes the solubility limitation with respect to dimethyl sulfide, resulting in high efficiency scrubbing to low residual values below 5 ppm.

SUMMARY OF THE DISCLOSURE

In summary of this disclosure, the present invention provides a novel procedure for removing total reduced sulfur from NCG's by oxidation and absorption of the oxidation products. Modifications are possible within the scope of is invention.

What we claim is:

1. A method of removing oxidizable non-condensible gases (NCG's) comprising hydrogen sulfide, methyl mercaptan, dimethyl sulfide and dimethyl disulfide, from a gas stream containing the same, which comprises:

contacting the gas stream with atomized water droplets having a droplet size distribution of about 5 to about 250 microns Sauter Mean Diameter (SMD) in one or more prescrubbing stages to cool the gas stream to its adiabatic temperature and to remove particulate matter out of the gas stream;

contacting the gas stream with an oxidizing liquid which is an aqueous solution of chlorine dioxide by intimate gas-liquid and gas-gas contact in one or more contact stages to oxidize reduced sulfur compounds and any other oxidizable compounds present in the gas stream, such contacting being effected by finely atomizing said aqueous solution of chlorine dioxide into the gas stream in each of said contact stages to form a spray of droplet size distribution of about 5 to about 250 microns Sauter Mean Diameter (SMD), and passing the treated gases through an entrainment separator to remove entrained liquid droplets from the gas stream.

2. The method of claim 1 wherein the droplet size distribution of the droplets in said one or more contact stages is about 10 to about 100 microns SMD.

3. The method of claim 2 wherein the spray is formed by feeding said aqueous solution of chlorine dioxide to a dual-fluid spray nozzle under an atomizing pressure of about 20 to about 55 psig.

4. The process of claim 3 wherein said aqueous chlorine dioxide solution has a concentration of about 2 to about 5 g/L.

5. The method of claim 1 wherein the spray is formed by feeding said aqueous solution of chlorine dioxide to a dual-fluid spray nozzle under an atomizing pressure of about 25 to about 100 psig.

6. The process of claim 5 wherein said aqueous solution of chlorine dioxide has a concentration of about 1 to about 10 g/L.

7. The process of claim 1 wherein the quantity of chlorine dioxide contacting the gaseous stream is at least sufficient to oxidize the total oxygen demand content of the gas stream.

8. The process of claim 7 wherein the molar ratio of chlorine dioxide used to the quantity of total oxygen den is about 1:1 to about 3:1.

9. The method of claim 1 wherein said droplet distribution of the droplets in said one or more prescrubbing stages is about 10 to about 40 microns SMD.

10. The method of claim 1 wherein the gas stream from the entrainment separator is contacted with an aqueous neutralizing and reducing solution by intimate gas-liquid contact in one or more contact stages to remove acidic compounds formed in the contacting step from the gas stream and to reduce any gaseous chlorine dioxide remaining from the contacting step and present in the gas stream, and the gas stream so treated is passed through a further entrainment separator to remove entrained liquid droplets from the gas stream, said contacting being effected by finely atomizing said aqueous neutralizing and reducing solution into the gas stream into each of said contact stages to form a spray of droplet size distribution of about 5 to about 100 micron SMD.

11. The method of claim 10 wherein said droplet distribution of the droplets of the aqueous neutralizing and reducing solution is about 20 to about 60 microns SMD.

12. The method of claim 11 wherein the spray is formed by feeding said aqueous neutralizing and reducing solution to a dual-fluid spray nozzle under an atomizing pressure of about 20 to about 55 psig.

13. The method of claim 10 wherein the spray is formed by feeding said aqueous neutralizing and reducing solution to a dual-fluid spray nozzle under an atomizing pressure of about 15 to about 100 psig.

14. The method of claim 10 wherein said neutralizing and reducing solution is provided by a Kraft pulp mill white liquor containing sodium hydroxide and sodium sulfide.

15. The method of claim 10 wherein said neutralizing and reducing solution is provided by aqueous sodium sulfite or alkaline hydrogen peroxide.

16. The method of claim 10 where the gas stream is passed through an additional entrainment separator to remove liquid droplets from the gas and to provide a discharge gas stream and the discharge gas stream is contacted with an aqueous medium by intimate gas-liquid contact in one or more contact stages to dissolve methanol vapor from the discharge gas stream, said contacting step being effected by finely atomizing said aqueous medium into the gas stream in each of said contact stages to form a spray therein.

17. The method of claim 10 wherein the gas stream is passed through an additional entrainment separator to remove liquid droplets from the gas and to provide a discharge gas stream and said discharge gas stream is monitored for reduced sulfur compounds concentration and chlorine dioxide concentration, and the quantity of aqueous chlorine dioxide solution feed to the oxidizing step or the quantity of aqueous neutralizing and reducing solution feed to the neutralizing step are modified in response to changes in said monitored concentrations beyond predetermined values to return the respective monitored concentrations to below the predetermined values.

* * * * *